United States Patent Office 2,811,483
Patented Oct. 29, 1957

2,811,483

PHARMACEUTICAL COMPOSITION AND PROCESS FOR PREPARING THE SAME

Joseph P. Aterno, Terre Haute, Ind., and Robert G. Heyner, Brightwaters, Arthur F. Leyden, Jr., Flushing, and Daniel Pindzola, Brooklyn, N. Y., assignors to Chas. Pfizer & Co., Inc., New York, N. Y., a corporation of Delaware No Drawing. Application December 9, 1954, Serial No. 474,302

7 Claims. (Cl. 167—81)

This invention relates to preparations intended primarily for use as a dietary supplement and to correct existing nutritional deficiencies, and more particularly to vitamin and/or mineral compositions prepared in the form of discrete beadlets containing a protected coating of the essential vitamins and minerals necessary to meet the human minimum daily requirements for these vital substances.

In the past, the administration of vitamins and minerals in definite quantity has generally taken the form of capsules or tablets containing the vitamins and/or minerals in the desired proportions. Elixirs have also been employed to some extent, but these have the disadvantage of poor stability if an aqueous medium is employed, and unpleasant taste or sensation if the vehicle contains oil. This has resulted in the use of tablets and capsules, particularly gelatin capsules containing the vitamins and minerals in an oily suspension. However, the provision of the minimum daily requirements of these substances in one capsule or tablet results in a relatively large object for the consumer of the item to swallow. This problem is particularly acute in the case of children, who dislike experience of swallowing "pills," or taking other ordinary forms of vitamins and minerals which to them have the character of "medicine."

It has now been found that these problems can be satisfactorily resolved by coating a plurality of hard spherical cores or beadlets of edible material with vitamins and/or minerals and sugar to produce discrete beadlets containing the essential vitamins and minerals in the proportions necessary to provide a measurable amount of potency per unit volume of such beadlets. These beadlets are readily administered both to children and adults by the teaspoon. They are particularly suitable for administration to children by sprinkling the same on breakfast cereals, cakes, confections and, in general, on any food product which is not served in a heated condition or otherwise subjected to excessive heat after application of the beadlets.

As stated, the beadlets of this invention are formed by coating a relatively hard core of edible material with vitamins and minerals in the appropriate proportions to meet the minimum daily requirements of children or adults. A preferred form of such material may readily be obtained in the form of nonpareil seeds, the commercially available core employed in the manufacture of nonpareils. As is well known, nonpareils are multi-colored beadlets which are commonly employed in the baking and confectionery trades to adorn cakes, cookies, candies and the like.

Nonpareil seeds are hard spherical beadlets formed by building up fine granulated sucrose crystals with successive coatings of sugar syrup and starch in a rotating drum or coating pan. The sucrose crystals are of such a size as to facilitate a rolling action, say about 30 mesh, so that a spherical beadlet may be formed from each crystal. The sugar syrup employed is that known in the trade as "simple syrup," i. e., a 65% aqueous solution of sucrose as described in the U. S. Pharmacopoeia, while corn starch is used to furnish the necessary body. This results in a hard spherical core, relatively insoluble in sugar syrup, from about 10 to 35 mesh (i. e., having a diameter of about 2000 to 400 microns) in size, and composed essentially of approximately 80% cane sugar and 20% starch. While these proportions of sugar and starch are preferred, from about 50% to 90% sugar and the balance starch is satisfactory for most purposes. In the present invention, it is preferred to employ nonpareil seeds of about 18 to 30 mesh, or having an average diameter of about 980 to 590 microns. Other materials which are relatively insoluble in sugar solution may be employed to produce these seeds in lieu of starch, such as calcium carbonate, clays, etc. An important prerequisite, of course, is that the resulting seed be edible, i. e., that it be capable of being chewed and digested by humans without adverse effect. It should also be readily coated as will be hereinafter described, and it should not interfere with the action of vitamins and minerals upon their application thereto or upon consumption of the finished beadlet.

In accordance with the present invention, a plurality of hard spherical cores of edible material, such as nonpareil seeds, are coated with a sugar syrup, such as simple syrup, in an amount sufficient to thoroughly wet the same and render each core sticky for subsequent application of the vitamins and minerals. For this purpose, it is preferred to employ an aqueous syrup containing from about 50% to 80% of cane sugar. The coating is conveniently accomplished by placing the seeds in a coating pan or rotating drum equipped with means for drying, slowly applying the syrup during rotation of the pan, i. e., while the seeds are under agitation. The amount of syrup to be employed in any given case will depend on a number of factors, such as the size or surface area of the seed, the concentration of the syrup and its viscosity. At no time should the seeds be permitted to become sticky enough to form twins or agglomerates. After the seeds become sufficiently sticky, the vitamins and minerals are applied in finely divided form while agitating the entire mass. The vitamins and minerals are in most instances first milled to a sufficiently fine particle size so that they may be dusted on to the sticky seeds and retained thereby. An average particle size of from about 5 to 200 microns is generally sufficient to produce a readily adhering homogeneous coating of vitamins and/or minerals. As in the case of the syrup, the amount of vitamins and minerals may vary with a number of factors, such as the quantity of syrup applied, the size of the seeds, the condition of their surfaces and, of course, the particle size, density and potency of the vitamins and minerals.

It will be appreciated that it is difficult, if not impossible, to apply in one coating operation a sufficient quantity of vitamins and minerals to provide the desired levels thereof per unit volume of beadlets. Accordingly, the process of coating with syrup followed by coating with vitamins and minerals is successively repeated, until the desired quantities of these materials are built up in the coatings on each seed. This may require as many as 10 to 50 successive coatings, building the vitamins and/or minerals up into a coating of from about 250 to 1000 microns in thickness. Between successive coats the seeds are dried, preferably by blowing hot air therethrough during agitation.

The vitamins and/or mineral-coated seeds are then further coated with an edible plastic or resinous material, such as gums, natural and synthetic resins, drying oils and the like, to seal and protect the vitamins from the influence of air and moisture. Suitable sealing materials include the following: Shellac, silicon resins, zein (corn protein), hydroxy ethyl cellulose, cellulose acetate phthalate, polyvinylpyrrolidone, and peanut oil. This protective coating must, of course, be inert with respect to the vitamins and minerals. The sealer may also be employed to isolate the incompatible vitamins and minerals from one another as will be more fully described. The plastic material is advantageously applied in the form of a dilute solution during agitation of the coated seeds to prevent their adhering to one another. While the amount of plastic may vary considerably, it is generally employed in an amount sufficient to incase the coated seeds in a thin, substantially air and moisture-impervious coating. While a monomolecular film may be adequate for some purposes, it is preferred that this film be of sufficient thickness to provide an effective taste barrier separating the distasteful vitamins and minerals from the coatings to follow. A film of approximately 150 to 750 microns in thickness has been found to be quite effective for this purpose. This may require as many as 1 to 5 coats of plastic material to achieve the desired result. The coating is, of course, dried to remove any adhering solvent.

Upon completion of the sealing coating, the seeds are next provided with a confectionery coating to improve the taste and or mask the metallic and sour tastes of some of the vitamins and minerals. This may take the form of a candy coating which is readily obtained by applying additional syrup, such as simple syrup, and drying, in successive coats until the desired thickness is obtained. Suitable flavoring agents and edible dyes may be added to the syrup at this point if desired to color the product and to further mask the distasteful vitamins and minerals. Alternatively, a highly advantageous product of softer texture may be obtained by applying to the vitamin and mineral-coated seeds, successive coats of simple syrup and pulverized sugar. This technique is repeated, with drying between coats, until a soft sugar coating of from about 250 to 1250 microns in thickness is built up over the vitamins and minerals. Approximately 10 to 50 successive coatings of syrup and pulverized sugar may be required to develop this thickness. When using pulverized sugar, it is preferred to start coating with a smaller edible core than would be required when only a hard candy coating is applied to the vitamin and mineral-coated cores. In either case, further sweetness may be imparted to the finished product by adding synthetic sweetening agents, such as sodium sucaryl and saccharin to the syrup and/or pulverized sugar.

Coloring of the beadlets is conveniently accomplished by incorporating edible dyes in the simple syrup which is used to apply the confectionery coating to the beadlets as described. In accordance with one embodiment of this invention, the various vitamins and minerals may be separately coated and colored with a variety of different coloring agents to produce a finished multi-colored product, each beadlet of which represents different vitamins and minerals. This colored material not only adds to the appearance of the beadlets, but also cooperates with the other coatings on the finished beadlets to protect the vitamins and minerals from the deleterious influence of light.

While suitable flavoring agents may be incorporated in the confectionery coating as previously mentioned, it is preferred to apply such flavoring agents after the desired coatings of syrup and pulverized sugar have been completed. In view of the soft texture of the sugar coating, the flavoring agents readily permeate the coating and are effectively retained thereby. Alcohol-soluble flavoring agents have been found to be especially well adapted for this purpose. When such agents are applied in alcohol solution, the resulting product may be dried at room temperature, which favors retention of the flavor, in contrast to the water-soluble agents which tend to become lost on drying at the more elevated temperatures required. This furthermore has the advantage of reducing the quantity of flavoring required.

Following application of the flavoring agent, it is well to add a further coating of plastic material, such as shellac, to seal in the flavor and serve as an additional protective coating for the inner coatings of vitamins and minerals. Thereafter, a quantity of pulverized sugar may be added to prevent sticking, and the coating process may be concluded with the application of one or more coatings of simple syrup to mask any adverse taste possibly imparted by the plastic material. If desired, additional dye in simple syrup may be applied to the outer periphery of the beadlets to enhance the brilliance of any color previously applied.

Upon completion of the described operations, the beadlets are preferably polished with a thin coating of an edible wax such as carnauba or beeswax, to seal the same from the atmosphere, prevent stickiness, and provide an attractive finish. The wax coating also facilitates improved flow of the beadlets in subsequent blending and packaging operations. However, care should be taken not to employ an excessive quantity of wax in order to avoid the production of an electrostatic charge on the beadlets which may interfere with proper blending. Advantageously, just enough wax is employed to provide a uniform film thereof about the beadlets.

Where elevated temperatures are required, drying between the successive coating operations outlined is conveniently accomplished by passing heated air through the mass of beadlets during agitation thereof to insure intimate contact between the air and beadlet surfaces. The application of a vacuum is also useful to accelerate drying. If desired, the air may be sterilized in any convenient manner, as by filtration and/or heat sterilization. The temperature of the air as it contacts the beadlets should, of course, be carefully regulated to avoid destruction or loss in potency of the vitamins, a temperature from about 100 to 140° F. being satisfactory. In some instances, a more elevated temperature, say up to 160° F., may be employed if an inert gas such as nitrogen or carbon dioxide is used in lieu of air for drying purposes.

While the beadlets of this invention are particularly suitable for children, they may be administered to both children and adults, and the preferred vitamin and mineral dosages set forth herein are those generally applicable to both. Moreover, the proportions and concentrations referred to are the daily dosage of each vitamin or mineral advantageously employed in the most preferred composition of the invention. The essential vitamins herein referred to are vitamins A, B, C and D, which are present in such variable quantities in ordinary food that deficiencies in one or more of such vitamins often takes place in the case of persons on unbalanced diets.

Vitamin A is known to have important functions in connection with vision epithelial tissues and growth. Its function, particularly in connection with growth, is of course, closely correlated with the body mechanisms involved in the utilization of fat, as well as carbohydrates and proteins. The minimum daily requirement (i. e., the MDR) of vitamin A has been established and is 4,000 U. S. P. units for adults and 3000 U. S. P. units for children. Accordingly, the amount of vitamin A that is combined with one day's dosage of the composition of the invention may range from about 4,000 U. S. P. units to about 8,000 U. S. P. units. It is, of course, to be understood that the instant invention does not exclude the use of a substantially greater amount of vitamin A, for example, as much as 50,000 U. S. P. units, which may be employed in the case of a severe vitamin A deficiency. However, since the purpose of the instant invention is to supply an amount of vitamin A sufficient to effectively supplement the diet, the amount of vitamin A which is ordinarily required for the purposes of the instant invention ranges from 100% to 200% of the minimum daily requirements. The preferred amount of vitamin A is about 5,000 U. S. P. units, or 125% of the adult MDR. (As used herein, the dosages of the various vitamins and minerals are dosages based upon the daily dosage of the composition unless otherwise designated). A particularly useful form of vitamin A is that sold under the trademark "Crystalets." This product consists of discrete beadlets of gelatin, containing crystalline vitamin A acetate in varying proportions. An especially useful type has a particle size of from 74 to 200 microns and contains approximately 500,000 units of vitamin A per gram.

Vitamin B, as used generically (sometimes referred to as "Vitamin B Complex"), comprises a group of essentially water-soluble factors or enzymes present in yeast, liver and whole grain; and such factors are known to have a number of different functions in connection with the nervous and circulatory system. The factors or enzymes of vitamin B include thiamin hydrochloride or mononitrate, riboflavin, cyanocobalamine or hydroxy cobalamine, nicotine acid (and niacinamide or nicotinic acid amide), pantothenic acid, choline, folic acid, and various separately designated vitamins such as vitamins I, J, L, M, U and W. Each of the foregoing species of vitamin B has also been given other names or designations, such as vitamin $B_1$, $B_2$, $B_{12}$ etc. It has been found that each of the foregoing enzymes or factors participates, in combination with other more complex enzymes, in the carrying out of the vital body functions.

Vitamin $B_1$, available as thiamine mononitrate or thiamin hydrochloride, is a well known species of vitamin B whose function is directly connected with the nervous and circulatory systems. The MDR of vitamin $B_1$, has been established as one mg. for adults and 0.5 to 0.75 mg. for children. In the instant invention, the amount of vitamin $B_1$ used should range from about one mg. to about three mg. (i. e., 100–300% of the adult MDR). The use of amounts of vitamin $B_1$ substantially in excess of that range is, of course, not excluded in the case of persons suffering a severe deficiency of vitamin $B_1$.

Vitamin $B_2$ or riboflavin is one of the relatively heat stable factors of vitamin B. The adult MDR of riboflavin is 2.0 mg. and the amount of riboflavin that may be used in the practice of the instant invention ranges from about 1.0 mg. to about 3 mg., the preferred amount being about 1.0 mg.

While the need for niacinamide has been established, the MDR has not. However, it has been found that the preferred amount of niacinamide for use in the instant invention is about 10 mg. Higher or lower amounts, such as from about 5 mg. to about 30 mg. may of course be employed.

The MDR for pantothenic acid, also a species of vitamin B, has not been established. However, pantothenic acid is advantageously incorporated in the composition in the form of calcium pantothenate. The amount of calcium pantothenate that may be used in the practice of the instant invention ranges from about 2 mg. to about 10 mg. and the preferred amount is about 5 mg.

The need for vitamin $B_6$ in human nutrition has been established, but the MDR has not. Pyridoxine hydrochloride is an advantageous form of vitamin $B_6$ which may be used in the practice of the present invention. The amount employed ranges from about 0.2 mg. to about 2 mg., the preferred amount being about 1.0 mg.

The need for vitamin $B_{12}$ in human nutrition has been established, but the MDR has not. The amount of vitamin $B_{12}$ which is used may range from 1 to 10 mcg., although 1 mcg. is adequate for most purposes.

The need for folic acid has likewise been established, but the MDR has not. When employed in accordance with thhe present invention, from about 1 to 5 mg. of folic acid is generally sufficient.

The other species of vitamin B hereinbefore referred to may also be incorporated in the composition of the instant invention; however, the need for these species in human nutrition has not been definitely ascertained. Accordingly, the composition of the invention preferably contains only those six species of vitain B last mentioned, although the composition may contain all of the species of vitamin B mentioned herein, for example, in the form of the so-called vitamin B complex.

Vitamin C, or 1-ascorbic acid, is well known as the vitamin which prevents scurvy and it is also very important in the growth processes, particularly the growth of bones and teeth. Raw fruits and vegetables are ordinarily good sources of vitamin C. The adult MDR of vitamin C is 30 mg. and the MDR for children is 20 mg. The amount of vitamin C that may be used in the practice of the instant invention ranges from about 20 mg. to about 100 mg. The preferred amount of vitamin C is about 75 mg. or 250% of the adult MDR. It is preferred to employ salts of ascorbic acid, such as sodium and calcium ascorbate, to provide a finished product of improved taste.

Vitamin D may be obtained naturally from fish oils or synthetically by irradiation of 7-dehydrocholesterol or ergosterol. The MDR of vitamin D is 400 U. S. P. units and the amount of vitamin D that may be used in the instant invention ranges from about 400 to about 1000 U. S. P. units. The preferred amount is about 1000 U. S. P. units. As in the case of vitamin A, vitamin D is available in the form of gelatin beadlets under the trademark "Crystalets." An especially useful type contains about 500,000 units/gm. vitamin A activity and 100,000 units/gm. vitamin D activity in beadlets ranging from about 74 to 200 microns in size.

Vitamins other than the aforementioned vitamins A, B, C and D may also be incorporated in the composition of the instant invention. However, it has been found that deficiencies are most likely to occur in the case of one or more of the vitamins A, B, C and D in ordinary cases and, accordingly, the need for other vitamins involves essentially special considerations or peculiar circumstances not necessarily involved herein.

The minerals which are most likely to be deficient in the human system include iodine (I), manganese (Mn), cobalt (Co), potassium (K), molybdenum (Mo), iron (Fe), Copper (Cu), zinc (Zn), magnesium (Mg), calcium (Ca), and phosphorus (P). Many of these minerals are advantageously employed in the form of their corresponding gluconates to enhance the taste acceptance of the resulting product.

The MDR of iodine is about 0.1 mg., and the amount of iodine which may be used in the instant invention ranges from about 0.1 mg. to about 0.2 mg., the preferred amount being about 0.15 mg. Advantageously, iodine is incorporated in the composition in the form of one of its salts, as for example, potassium iodide. About 0.199 mg. of potassium iodide (U. S. P.) is equivalent to 0.15 mg. of iodine.

The MDR of manganese has not yet been definitely established. The amount of manganese to be used in the instant invention ranges from about 0.2 mg. to about 1.5 mg. The preferred amount of manganese for use in the instant invention is about 1.0 mg. Manganese is advantageously incorporated in the composition in the form of salts thereof, such as manganese gluconate and manganese sulfate. About 9 mg. of manganese gluconate is equivalent to 1.0 mg. of manganese.

The MDR of cobalt has not yet been ascertained. The amount of cobalt that may be used in the instant composition may range from about 0.05 mg. to about 0.2 mg. The preferred amount of cobalt being about 0.1 mg. Cobalt is most readily incorporated in the composition in the form of one of its salts, such as cobaltous gluconate or cobaltous sulfate. About 0.76 mg. of cobaltous gluconate is equivalent to 0.1 mg. of cobalt.

The MDR of potassium has not yet been ascertained. The amount of potassium used in the instant composition (in conjunction with potassium iodide) may range from about 1 mg. to about 10 mg. Potassium is also advantageously incorporated in the composition in the form of one of its salts, such as potassium gluconate or potassium sulfate. About 30 mg. of potassium gluconate is equivalent to 5.0 mg. of potassium, which is the preferred amount of potassium for use with the preferred amount of potassium iodide hereinbefore mentioned.

The amount of molybdenum that may be used in the practice of the instant invention ranges from about 0.1 mg. to about 0.5 mg. Ordinarily molybdenum is incorporated in the form of one of its salts, such as sodium molybdate. About 0.505 mg. of sodium molybdate ($Na_2MoO_4 \cdot 2H_2O$) is equivalent to 0.2 mg. of molybdenum, which is the preferred amount. The MDR has not yet been ascertained.

The MDR of iron is 10 mg. for adults and 7.5 for children 1 to 6 years old. The amount of iron that may be used in the instant invention ranges from about 5 mg. to about 20 mg. The preferred amount of iron for use in the invention is about 10.0 mg., the iron being incorporated in the form of one of its salts, as for example, ferrous gluconate or ferrous sulfate. About 90 mg. of ferrous gluconate is equivalent to 10.0 mg. of iron.

The MDR of copper has not yet been ascertained. The amount of copper that may be used in the instant invention ranges from about 0.5 mg. to about 2 mg. The preferred amount of copper for use in the instant composition is about 1 mg. The copper is also incorporated in the form of one of its salts, as for example cupric gluconate or cupric sulfate. About 7.2 mg. of copper gluconate is equivalent to 1 mg. of copper.

The MDR of zinc has not yet been ascertained. The amount of zinc that may be used in the instant invention ranges from about 0.2 mg. to about 2.0 mg. The preferred amount of zinc is about 1.2 mg. Zinc is readily incorporated in the composition in the form of its salt, zinc gluconate or zinc sulfate. About 8.5 mg. of zinc gluconate is equivalent to 1.2 mg. of zinc.

The MDR of magnesium has not yet been ascertained. The amount of magnesium that may be used in the instant invention ranges from about 1 mg. to about 10 mg. The preferred amount of magnesium is about 6.0 mg. Advantageously, magnesium is also incorporated in the composition in the form of one of its salts, such as magnesium gluconate or magnesium sulfate. About 110 mg. of magnesium gluconate is equivalent to 6 mg. of magnesium.

It will be appreciated that other essential minerals, such as calcium and phosphorus may also be included, usually in amounts substantially less than their MDR because many foods contain these minerals. In the case of children who ordinarily consume rather substantial amounts of milk and milk products rich in these minerals, it is possible to omit or reduce the quantities of these particular minerals in the instant composition. The MDR of each of these minerals has been established as 750 mg. for both children and adults. In the instant invention, it is preferred to employ a lesser proportion, say, 10 to 50% of the MDR in each case. Calcium phosphate is especially useful in providing both calcium and phosphorus. About 900 mg. of calcium phosphate provides approximately 213 mg. of calcium and 165 mg. of phosphorus.

As is well known, many vitamins and minerals are incompatible with one another, particularly in the presence of water, and many methods have been employed to prevent destruction of such incompatible materials. For example, vitamin $B_1$ is readily destroyed by alkalies and alkaline salts and, therefore, presents a problem if compounded directly with certain mineral salts. Vitamin $B_1$ is also incompatible with copper salts. In addition, vitamin $B_{12}$ is destroyed by reducing agents. Vitamin C, in turn, is inactivated by oxidizing agents and also deteriorates in the presence of copper and iron salts. Moreover, ferrous gluconate is a reducing agent, and, therefore, readily inactivates those vitamins which are susceptible to such reducing action.

It has been found that this problem of incompatibility can be successfully met by separating the incompatible vitamins and minerals from one another by a sealing coat of shellac or similar material such as those previously described. In such event, the compatible vitamins are applied to the desired thickness or quantity, followed by a coating of sealing material as outlined, and the incompatible materials are then added in successive coats until they too have been applied to the desired thickness. It is preferred, however, to separate the incompatible vitamins and minerals into fractions, each of which contains vitamins and/or minerals which are compatible with one another. These fractions are then separately applied to nonpareil seeds or other suitable cores which are treated as previously outlined. The finished fractions of coated beadlets may then conveniently be blended to provide a finished product which delivers the minimum daily requirements of vitamins and minerals per unit volume thereof, say per teaspoonful.

The invention is further illustrated by the following examples which are given for illustrative purposes and are not to be considered as imposing any limitation thereon.

*Example I*

Coated beadlets were prepared from the following materials in the proportions set forth:

| | Gms. |
|---|---|
| Vitamin $B_{12}$ | 6.98 |
| Vitamin $B_1$ (Thiamine mononitrate) | 7.27 |
| Vitamin $B_2$ (Riboflavin) | 5.64 |
| Vitamin $B_6$ (Pyridoxine hydrochloride) | 7.07 |
| Calcium phosphate dibasic | 1504.05 |
| Nonpareil seeds (30 mesh) | 700.00 |
| Coating solids (from simple syrup, sugar and color solution) | 2768.99 |
| | 5000.00 |

The vitamins were milled through a 0.010" herringbone screen, while the calcium phosphate dibasic was milled through a 60 mesh screen. Thereafter, these materials were thoroughly blended.

The nonpareil seeds were placed in a tablet coating pan equipped with a hot air blower for drying purposes, and wet, during revolution of the pan, with approximately 30 cc. of simple syrup to make them sticky. Approximately 70 gms. of the vitamin-calcium phosphate blend previously prepared was then added to the sticky seeds and the mixture was agitated constantly until the blend was distributed throughout the mass with no excess powder remaining in the interstices between the seeds. This was followed by drying with vacuum and hot air at about 130° F. while still agitating the mass. The aforesaid procedure was repeated with 30 to 40 cc. of syrup and about 70 gms. of the described blend per coat, until all of the blend was applied to the seeds in a series of about 22 successive coatings. This was followed with 3 coats of shellac in an amount of approximately 40 cc. per coat, each of which was dried under vacuum with moderate heat.

The dried seeds were then further coated with 40 cc. of simple syrup containing edible dye, followed by 20 gms. of powdered sugar, in a series of successive coats which were individually dried at 130° F. to provide a soft sugar coating completely surrounding the vitamin-mineral coating. A total of 1336 cc. of simple syrup and 668 gms. of powdered sugar were employed for this purpose. Thereafter, the coated seeds were subjected to drying for 24 hours at 100° F. Then a solution containing suitable flavoring agents in 30 cc. of ethyl alcohol was applied to the outer surfaces of the sugar-coated seeds, and the resulting product was dried under moderate vacuum.

After this, two additional coats of shellac at 50 cc. per coat were applied to seal in the flavor and to further protect the beadlets against moisture. A small quantity (20 gms.) of powdered sugar was dusted on to prevent sticking. This shellac coating was then covered with three 40 cc. coats of simple syrup containing the same dye as previously applied. After drying these coats with the aid of cold air and vacuum, the beadlets thus formed were polished by tumbling in the presence of a wax polishing solution containing approximately 8 gms. carnauba wax and 4 gms. of beeswax in 200 cc. of carbon tetrachloride. The finished beadlets were then dried and passed through a 12 mesh screen to reject any twins and agglomerates formed during the process.

*Example II*

Another portion of coated beadlets was prepared from the following materials in the proportions set forth:

| | Gms. |
|---|---|
| Vitamin A, 500,000 units/gm.; Vitamin D, 100,000 units/gm | 65.12 |
| Vitamin C (sodium ascorbate) | 545.00 |
| Niacinamide | 51.15 |
| Calcium pantothenate | 69.76 |
| Calcium phosphate dibasic | 799.98 |
| Nonpareil seeds (18 mesh) | 2000.00 |
| Coating solids (from simple syrup, sugar, and color coating solution) | 1468.99 |
| | 5000.00 |

The calcium phosphate dibasic and all of the vitamins, with the exception of vitamins A and D, were milled as in Example I. The vitamins A and D were employed in a finely divided gelatin beadlet of approximately 200 to 74 microns in size.

The nonpareil seeds were placed in a coating pan and coated with thoroughly blended vitamins and minerals of the above composition in accordance with the procedure of Example I. Jogging of the coating pan was employed to facilitate adherence of the gelatin beadlets to the nonpareil seeds. This was followed by the shellac coating, sugar coating, flavor coating, second shellac coating, candy coating and polishing steps described in that example. The finished beadlets were also passed through a 12 mesh screen.

*Example III*

Still another portion of coated beadlets was prepared from the following materials in the proportions set forth:

| | Gms. |
|---|---|
| Potassium iodide | 0.91 |
| Magnesium gluconate | 510.09 |
| Cobaltous gluconate | 3.56 |
| Potassium gluconate | 69.03 |
| Calcium phosphate dibasic | 947.42 |
| Nonpareil seeds (30 mesh) | 700.00 |
| Coating solids (from simple syrup and color solution) | 2768.99 |
| | 5000.00 |

The minerals listed above were milled and applied to the nonpareil seeds in accordance with the procedure of Example I, followed by the further coating steps described in that example. The finished beadlets were, of course, dried and also screened as described therein.

*Example IV*

Still another portion of coated beadlets was prepared from the following materials in the proportions set forth:

| | Gms. |
|---|---|
| Ferrous gluconate | 401.67 |
| Manganous gluconate | 42.24 |
| Sodium molybdate | 2.35 |
| Cupric gluconate | 33.19 |
| Zinc gluconate | 39.02 |
| Calcium phosphate dibasic | 1012.54 |
| Nonpareil seeds (30 mesh) | 700.00 |
| Coating solids (from simple syrup and color solution) | 2768.99 |
| | 5000.00 |

The minerals listed above were milled and applied to the nonpareil seeds in accordance with the procedure of Example I, followed by the further coating steps described in that example. The finished beadlets were, of course, dried and also screened as described therein.

*Example V*

Equal parts by weight of the beadlets prepared in accordance with Example I through IV were thoroughly blended to provide a mixture of free flowing beadlets, each teaspoonful (5 cc. or 4.3 gm.) of which provided the following vitamins and minerals in approximately the proportions set forth:

| | | |
|---|---|---|
| Vitamin A | units | 5000 |
| Vitamin D | units | 1000 |
| Vitamin $B_{12}$ | mcg | 1 |
| Thiamine mononitrate | mg | 1 |
| Riboflavin | mg | 1 |
| Pyridoxine hydrochloride | mg | 1 |
| Niacinamide | mg | 10 |
| Ascorbic acid | mg | 75 |
| Calcium pantothenate | mg | 5 |
| Calcium (dibasic calcium phosphate) | mg | 213 |
| Cobalt (cobaltous gluconate) | mg | 0.1 |
| Copper (cupric gluconate) | mg | 1.0 |
| Iodine (potassium iodide) | mg | 0.15 |
| Iron (ferrous gluconate) | mg | 10.0 |
| Manganese (manganous gluconate) | mg | 1.0 |
| Magnesium (magnesium gluconate) | mg | 6.0 |
| Molybdenum (sodium molybdate) | mg | 0.2 |
| Phosphorous (dibasic calcium phosphate) | mg | 165.0 |
| Potassium (potassium gluconate) | mg | 5.0 |
| Zinc (zinc gluconate) | mg— | 1.2 |

This blend was free from mottling, foreign matter and agglomerates and all beadlets passed readily through a 12 mesh screen. Each of the preparations of Examples I–IV is advantageously provided with a different color and assayed for all components before blending to form the final composition. The final blend may also readily be assayed to insure proper blending of the various components. The blend so prepared exhibited good stability upon aging at room temperature and at 37° C. for a period of two months.

It will be apparent from the foregoing description that it is not essential to employ all of the vitamins and minerals previously described in the preparation of the beadlets of this invention. Thus, one may coat with either vitamins or minerals or with various selected combinations thereof to meet the needs of individual situations. As pointed out, the amount of vitamins and/or minerals employed may vary considerably, depending upon a number of factors such as the size of the beadlets, their surface area, the potency of the vitamins, purity of vitamins and minerals and the persons for whom the product is intended, i. e. children or adults. The method of coating is also a factor, slightly more vitamins and minerals generally being necessary per unit weight of beadlet when all vitamins and minerals are to be applied to one batch of seeds than is necessary when they are applied to separate fractions as described in the preceding examples. In each case, however, the vitamins and/or minerals are applied in an amount sufficient to furnish the minimum daily requirements of the consumer per unit volume of finished beadlet, as will be apparent to those skilled in the art.

It will be apparent to those skilled in the art that the present invention may be adapted to prepare a product having enteric properties, i. e., one in which discrete beadlets containing dietary or therapeutic agents are coated in such a manner as to delay body absorption of the active ingredients for a predetermined period. Advantageously, exposure of the active ingredients should occur in the small intestine, where the major proportion of absorption is generally believed to occur. Thus, vitamins, minerals, antibiotics, hormones, and a wide variety of pharmaceutical agents may be incorporated into beadlets to provide a highly effective enteric dosage form.

This may be accomplished in several ways. The thickness of the first plastic coating of sealing material may be increased to about 500 to 2000 microns to retard disintegration of the coating until the beadlets have progressed to the desired point in the alimentary canal. The coating materials which are preferred for this purpose should be stable and retain their sealing characteristics in gastric juice, but disintegrate or dissolve in intestinal juice.

Another method for forming an enteric-coated product involves applying successive coatings of the active ingredient, with the aid of simple syrup, and separating the same with coatings of the sealing material. For instance, one fourth of the active ingredient to be employed, may be applied to nonpareil seeds as set forth hereinabove. This may be followed with say four coats of a sealing material of the character described. After drying, another fourth of the active ingredient may be applied between successive coatings of simple syrup, followed by three coats of the sealing material. The next fourth of active ingredient may be followed with two coats of sealing material, and the final fourth with one coat thereof. These coatings may be followed by the sugar and other coatings previously described if desired. In such manner, an enteric product may be varied to free any predetermined proportion of the active ingredient at the most advantageous location for maximum absorption.

Resort may be had to such modifications and equivalent as fall within the spirit of the invention and the scope of the appended claims.

What is claimed is:

1. A pharmaceutical preparation comprising a plurality of discrete beadlets, each of which is composed of a hard spherical core of edible sugar-containing material having a diameter of from about 400 to 2000 microns, coated successively with at least one substance having an average particle size of from about 5 to 200 microns and selected from the group consisting of vitamins, nutritionally desirable minerals and mixtures thereof, said coatings having a total thickness of from about 250 to 1000 microns; an edible, substantially air- and moisture-impervious layer having a thickness of from about 150 to 750 microns and composed of protective plastic material selected from the group consisting of gums, natural and synthetic resins and drying oils; and a confectionery layer having a thickness of from about 250 to 1250 microns; the said vitamins and minerals being so proportioned on said beadlets as to provide substantially the human daily requirements of said substances per unit volume of said beadlets.

2. The product of claim 1 having as a final sealing layer a further coating of said plastic material.

3. The product of claim 1 wherein the hard spherical cores are composed of from about 50% to 90% sugar and the balance starch.

4. The product of claim 2 wherein the plastic material is shellac.

5. A process for preparing a pharmaceutical composition comprising the steps of coating a plurality of hard spherical beadlets, having a diameter of from about 400 to 2000 microns and composed of edible sugar-containing material which is relatively insoluble when exposed to sugar syrup, with separate blends of selected vitamins and nutritionally desirable minerals having an average particle size of from about 5 to 200 microns, the incompatible vitamins and minerals being separated from one another and applied to different batches of said spherical beadlets, said coating having a total thickness on the beadlet of from about 250 to 1000 microns, thereafter applying an edible protective coating having a thickness of from about 150 to 750 microns and composed of plastic material selected from the group consisting of gums, natural and synthetic resins and drying oils, to render said beadlets substantially impervious to moisture, following said plastic material with a confectionery coating having a thickness of from about 250 to 1250 microns, drying this coating and blending the separate batches of coated beadlets to form a mixture of discrete free-flowing beadlets providing substantially the human daily requirement of vitamins and minerals per unit volume thereof.

6. The process of claim 5 in which the vitamins and minerals are applied in four separate batches, each of which contains substantially the following ingredients:

| Batch 1 | Batch 2 |
| --- | --- |
| Vitamin B₁₂.<br>Vitamin B₁ (Thiamine mononitrate).<br>Vitamin B₂ (Riboflavin).<br>Vitamin B₆ (Pryidoxine Hydrochloride).<br>Calcium Phosphate Dibasic. | Vitamin A.<br>Vitamin D.<br>Vitamin C (Ascorbic Acid)<br>Niacinamide.<br>Calcium Pantothenate.<br>Calcium Phosphate Dibasic. |

| Batch 3 | Batch 4 |
| --- | --- |
| Potassium Iodide.<br>Magnesium Gluconate.<br>Cobaltous Gluconate.<br>Potassium Gluconate.<br>Calcium Phosphate Dibasic. | Ferrous Gluconate.<br>Manganous Gluconate.<br>Sodium Molybdate.<br>Cupric Gluconate.<br>Zinc Gluconate.<br>Calcium Phosphate Dibasic. |

7. An enteric pharmaceutical preparation comprising a plurality of discrete beadlets, each of which is composed of a hard spherical core of edible sugar-containing material having a diameter of from about 400 to 2000 microns, coated successively with at least one substance having an average particle size of from about 5 to 200 microns and selected from the group consisting of vitamins, nutritionally desirable minerals and mixtures thereof, said coatings having a total thickness of from about 250 to 1000 microns; and with edible, substantially air- and moisture-impervious layers having a thickness of from about 150 to 750 microns and composed of protective plastic material which is stable in gastric juice but disintegrates in intestinal juice and is selected from the group consisting of gums, natural and synthetic resins and drying oils; the said vitamins and minerals being so proportioned on said beadlets as to provide substantially the human daily requirements of said substances per unit volume of said beadlets.

References Cited in the file of this patent

UNITED STATES PATENTS

| 312,041 | Upjohn | Feb. 10, 1885 |
| 2,146,867 | Welin | Feb. 14, 1939 |
| 2,262,087 | Bartlett | Nov. 11, 1941 |

FOREIGN PATENTS

| 495,854 | Great Britain | Feb. 15, 1937 |
| 669,782 | Great Britain | Apr. 9, 1952 |

OTHER REFERENCES

Drug and Cos. Ind., vol. 63, Oct. 1948, p. 431.